(12) United States Patent
Okamoto (10) Patent No.: US 7,898,677 B2
(45) Date of Patent: Mar. 1, 2011

(54) IMAGE PROCESSING APPARATUS (75) Inventor: Yuji Okamoto, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1013 days.

(21) Appl. No.: 11/726,769

(22) Filed: Mar. 22, 2007

(65) Prior Publication Data
US 2007/0236721 A1 Oct. 11, 2007

(30) Foreign Application Priority Data

Apr. 5, 2006 (JP) .............................. 2006-104317

(51) Int. Cl.
G06K 15/00 (2006.01)
G06F 3/12 (2006.01)
G06F 15/16 (2006.01)
H04N 1/00 (2006.01)

(52) U.S. Cl. .................... 358/1.14; 358/1.15; 358/401; 358/402; 358/403; 358/404; 358/405; 358/406; 358/407; 358/434; 358/435; 358/436; 358/437; 709/217; 709/218; 709/219

(58) Field of Classification Search .................. 358/1.1, 358/1.9, 1.14, 1.15, 1.16, 474, 486, 497; 399/36, 37, 70, 88, 89, 90; 700/22, 295, 700/297; 713/300, 320, 321, 330, 340
See application file for complete search history.

(56) References Cited

U.S. PATENT DOCUMENTS

| | | | | |
|---|---|---|---|---|
| 5,581,668 A * | 12/1996 | Oida et al. | .................. | 358/1.14 |
| 5,937,148 A * | 8/1999 | Okazawa | .................... | 358/1.13 |
| 6,459,496 B1 | 10/2002 | Okazawa | | |
| 6,658,576 B1 * | 12/2003 | Lee | ............................ | 713/320 |
| 6,813,037 B1 * | 11/2004 | Collard | ....................... | 358/1.15 |
| 6,903,830 B1 * | 6/2005 | Hane et al. | .................. | 358/1.13 |
| 7,716,304 B2 * | 5/2010 | Kimura et al. | .............. | 709/219 |
| 2004/0252334 A1 * | 12/2004 | Tanimoto et al. | ........... | 358/1.15 |
| 2006/0209341 A1 * | 9/2006 | Motoyama et al. | ......... | 358/1.15 |

FOREIGN PATENT DOCUMENTS

| | | |
|---|---|---|
| JP | 07-226815 | 8/1995 |
| JP | 08-101606 | 4/1996 |
| JP | 08-204865 | 8/1996 |
| JP | 2000-148615 | 5/2000 |
| JP | 2002-218099 | 8/2002 |
| JP | 2004-199543 | 7/2004 |
| JP | 2005-186425 | 7/2005 |

* cited by examiner

Primary Examiner—Twyler L Haskins
Assistant Examiner—Jonathan R Beckley
(74) Attorney, Agent, or Firm—David G. Conlin; Steven M. Jensen; Edwards Angell Palmer & Dodge LLP (57) ABSTRACT An image processing apparatus performs a processing of checking periodically whether data addressed to the image processing apparatus exist in a server apparatus while suppressing power consumption as much as possible. The NIC communicates with the server apparatus to check whether a storage unit of the server apparatus stores object data for processing addressed to the image processing apparatus. An energization switching unit switches the energization (power supply) to a main controlling unit that acquires the data addressed to the image processing apparatus from the server apparatus. The NIC controls the energization switching unit to activate the main controlling unit and the printer unit on the condition that the object data for processing addressed to the image processing apparatus is present.

13 Claims, 7 Drawing Sheets

WEEKLY SCHEDULE

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | ** | ** | ** | ** | ** | ** | ** | ** | ** | ** | | | | | |
| Tue | | | | | | | | | | ** | ** | ** | ** | ** | ** | ** | ** | ** | ** | ** | ** | ** | | |
| Wed | | | | | | | | | | ** | ** | ** | ** | ** | ** | ** | ** | ** | ** | ** | ** | ** | | |
| Thu | | | | | | | | | | ** | ** | ** | ** | ** | ** | ** | ** | ** | ** | ** | ** | ** | | |
| Fri | | | | | | | | | | ** | ** | ** | ** | ** | ** | ** | ** | ** | ** | | | | | |
| Sat | | | | | | | | | | ** | ** | ** | ** | | | | | | | | | | | |
| Sun | | | | | | | | | | | | | | | | | | | | | | | | |

IMAGE PROCESSING APPARATUS

CROSS-NOTING PARAGRAPH

This Non-provisional application claims priority under 35 U.S.C. §119 (a) on Patent Application No. 2006-104317 filed in JAPAN on Apr. 5, 2006, the entire contents of which are hereby incorporated herein by reference.

FIELD OF THE INVENTION

The present invention relates to an image process apparatus for acquiring and processing the data that is addressed to that apparatus and stored in a storage unit of a predetermined server apparatus through a communicating unit.

BACKGROUND OF THE INVENTION

An image processing apparatus, such as a multi-function machine including a printer, scanner, facsimile machine, and copier or functions thereof, generally includes a communicating unit (such as a NIC (Network Interface Card) or a modem (Modulator-Demodulator)) that communicates with an external apparatus (such as a computer or other image processing apparatuses) through a communication medium such as a network or telephone lines. Some of such image processing apparatuses include a function (hereinafter, a sleep function) for shifting into a power-saving state (generally, a sleep mode) with lower power consumption than a normal operation state if a predetermined sleep condition is satisfied in the normal operation state.

The sleep condition includes, for example, a condition that no operation is performed for an operation input unit included in the image processing apparatus and no data are received from an external apparatus through the communicating unit for a certain time period or more. In other cases, the sleep condition may include a condition that the current clock time is within a time zone set in a predetermined time schedule (e.g., weekly schedule).

In the power-saving state, for example, energization (power supply) is cut off to the devices such as a fixing apparatus including a heater and a control circuit, while the communicating unit is often maintained in an energized state. This is because in the power-saving state, energization of devices in non-energized state is automatically resumed according to a request from an external apparatus to allow the devices to automatically return to the normal operation state. For example, in an image forming apparatus shown in Japanese Laid-Open Patent Publication No. 8-101606, when an energized communicating unit receives a print request in a power-saving state, the entire apparatus is energized to form an image in accordance with the received print request.

In an image forming apparatus shown in Japanese Laid-Open Patent Publication No. 2005-186425, when an energized controller receives an access request for a hard disk from an external apparatus through a network in a power-saving state, energization of the hard disk is started to perform the requested processing.

On the other hand, some image processing apparatuses such as a network facsimile apparatus and multi-function machine include a function of transmitting and receiving e-mail. For example, the network facsimile apparatus includes functions for accessing an e-mail server (an example of server apparatuses) through the NIC, for receiving e-mail data addressed to the image processing apparatus (the data to be processed by the image processing apparatus) and for printing the image data included as an attachment file in the e-mail data. Such an image processing apparatus includes a controlling unit that communicates with the e-mail server through the NIC to perform a processing of periodically checking whether or not new e-mail data addressed to the image processing apparatus has arrived (hereinafter, a new e-mail checking processing) and a processing of receiving new e-mail data addressed to the image processing apparatus (hereinafter, called a new e-mail receiving processing). Typically, this controlling unit comprehensively controls the entire image processing apparatus and is often connected to a mass storage apparatus (such as a hard disk drive) for storing various data including e-mail data.

Once the controlling unit stores the e-mail data in a hard disk, etc., a predetermined printing unit prints the image data included as an attachment file in the e-mail data.

However, if the controlling unit performs the new e-mail checking processing periodically or at an arbitrary timing through the communicating unit (NIC) in the image processing apparatus including the receiving function for the e-mail data, the problem of wasting electric power is caused because the controlling unit must always be maintained in the energized state or the start and stop of the controlling unit must be repeated frequently.

SUMMARY OF THE INVENTION

It is the object of the present invention to provide an image processing apparatus that can perform a processing of checking periodically or at an arbitrary timing whether or not the data (such as e-mail data) addressed to the image processing apparatus exist in a server apparatus such as an e-mail server and a processing such as reception of the data while power consumption of the image processing apparatus is suppressed as much as possible.

The present invention is applicable to an image processing apparatus including a communicating unit (a typical example is a NIC) that communicates with a predetermined server apparatus (generally, a computer) and includes the elements described in the following (1) to (4):

(1) a data presence checking unit that communicates with the server apparatus through the communicating unit to check whether or not a storage unit of the server apparatus stores the object data for processing addressed to the image processing apparatus;

(2) a data acquisition controlling unit that acquires through the communicating unit the object data for processing addressed to the image processing apparatus and stored in the storage unit of the server apparatus;

(3) an energization switching unit that switches whether the data acquisition controlling unit is energized independently of the communicating unit and the data presence checking unit; and (4) an automatic activating unit that controls the energization switching unit to switch the data acquisition controlling unit into the energized state on the condition that at least the data presence checking unit confirms that the storage unit of the server apparatus stores the object data for processing addressed to the image processing apparatus when the data acquisition controlling unit is in the non-energized state.

In the image processing apparatus according to the present invention, the data presence checking unit can check whether or not the storage unit of the server apparatus stores the object data for processing addressed to the image processing apparatus while the data acquisition controlling unit is not energized. If the automatic activating unit switches the data acquisition controlling unit from the non-energized state to the energized state, the data acquisition controlling unit can certainly acquire the object data for processing addressed to the image processing apparatus. That is, the data acquisition controlling unit is not started in vain and the power consumption in the image processing apparatus is suppressed as much as possible.

If the communicating unit has both functions of the data presence checking unit and the automatic activating unit, the power consumption can further be suppressed.

The image processing apparatus according to the present invention may further include an automatic stopping unit that controls the energization switching unit to switch the data acquisition controlling unit into the non-energized state after the data acquisition controlling unit, which is switched into the energized state by the automatic activating unit, acquires the object data for processing addressed to the image processing apparatus and stored in the storage unit of the server apparatus.

Such an image processing apparatus can further reduce the power consumption.

The image processing apparatus according to the present invention may further include a data processing unit that executes a data processing based on the data received by the reception controlling unit. In this case, the energization switching unit also switches whether or not the data processing unit is energized independently of the energization of the communicating unit and the data presence checking unit. When the data processing unit is in the non-energized state, the automatic activating unit controls the energization switching unit to switch the data processing unit into the energized state on the condition that at least the data presence checking unit confirms that the storage unit of the server apparatus stores the object data for processing addressed to the image processing apparatus.

For example, the object data for processing includes print data that is an object for printing processing, and the data processing unit performs the printing processing based on the print data.

When it is confirmed that the data addressed to the image processing apparatus exist in the server apparatus, the image processing apparatus with such a structure can not only receive the data but also perform a data processing (such as the printing processing) for the received data.

In this case, after the data processing unit switched into the energized state by the automatic activating unit performs a data processing based on the object data for processing acquired by the data acquisition controlling unit, the automatic stopping unit may control the energization switching unit to switch the data processing unit into the non-energized state.

Such an image processing apparatus can further reduce the power consumption.

The image processing apparatus according to the present invention may further include an accompanying information acquiring unit that communicates with the server apparatus through the communicating unit to acquire accompanying information of the object data for processing addressed to the image processing apparatus and stored in the storage unit of the server apparatus. In this case, the automatic activating unit may switch either or both of the data acquisition controlling unit and the data processing unit into the energized state also on the condition that the accompanying information acquired by the accompanying information acquiring unit satisfies a predetermined condition.

For example, the accompanying information is the identification information of a transmission source that transmitted the object data for processing to the server apparatus and information representing the degree of importance of the object data for processing.

While the data acquisition controlling unit and the data processing unit are stopped, the image processing apparatus with such a structure can selectively acquire and process only the specific object data for processing satisfying a predetermined condition.

The image processing apparatus according to the present invention may further include a schedule controlling unit that controls the energization switching unit in accordance with a predetermined time schedule to control at least the energization state of the data acquisition controlling unit. In this case, the automatic activating unit may switch the data acquisition controlling unit into the energized state also on the condition that the time when the data presence checking unit confirms that the storage unit of the Server apparatus stores the object data for processing addressed to the image processing apparatus precedes the time of the next scheduled activation of the data acquisition controlling unit by the schedule controlling unit by a predetermined time period or more.

When the waiting time until the next scheduled activation time of the data acquisition controlling unit is relatively short, the image processing apparatus with such a structure does not start the data acquisition controlling unit to acquire the object data for processing. As a result, the power consumption of the data acquisition controlling unit can be suppressed as much as possible. Since the data acquisition controlling unit is started by the schedule controlling unit and the object data for processing are acquired when the next scheduled activation time comes (in the near future), the time of acquisition of the object data for processing is not considerably and problematically delayed.

The image processing apparatus according to the present invention may further include a check execution controlling unit that controls an execution timing of the checking processing of the data presence checking unit.

In this case, the check execution controlling unit controls the data presence checking unit to execute the checking processing based on, for example, one or more of the detections of periodical passage of time, of reception of the predetermined information from an external apparatus through the communicating unit, and of the predetermined operation on an operation input unit included in the image processing apparatus.

The object data for processing is, for example, e-mail data and the like. In this description, the term "e-mail data" means the data including header information of e-mail (information of address or information of transmission source), the data composed of body data (title and body text, etc.) and the data having image data and the like attached to said data.

PREFERRED EMBODIMENTS OF THE INVENTION

Embodiments of the present invention are described with reference to the accompanying drawing for understanding of the present invention. The following is an example of the embodiment of the present invention and it does not have the nature of limiting the technical scope of the present invention.

The image processing apparatus X according to the present invention and the image processing system Z including the image processing apparatus X as an element is described with reference to the block diagram shown in FIG. 1.

The image processing system Z includes one or more image processing apparatuses X and an e-mail server 31 that can communicate with each image processing apparatus X through a network 30 such as LAN and the internet.

The image processing apparatus X is an image processing apparatus that includes a function of acquiring and processing e-mail data (an example of object data for processing) addressed to the image processing apparatus stored in a storage unit of the e-mail server 31 (an example of a server apparatus) through a network interface card 5 (hereinafter, called NIC) The image processing apparatus X is a multi-function machine (image forming apparatus) functioning as a printer, copier, and network facsimile.

The e-mail server 31 is a computer connected to the network 30 such as the internet and receives and transmits e-mail data through the network 30 in accordance with the SMTP protocol, etc. When receiving an inquiry for arriving status of e-mail data or a transmission request for e-mail data from the image processing apparatus X through the network 30, the e-mail server 31 returns the reply to the inquiry for arriving status of e-mail data or transmits the data to the image processing apparatus X in accordance with the POP3 protocol, etc. The e-mail server 31 includes a storage unit 31a that is a nonvolatile storage unit, such as a hard disk, storing the e-mail data to be transmitted and received.

[Image Processing Apparatus X]

The image processing apparatus X can communicate with the e-mail server 31 through the network 30, for example, LAN and the internet, and includes the NIC 5 as a communicating unit for performing the communication.

The image processing apparatus X includes an operation/display unit 2, a hard disk drive 3 (hereinafter, called HDD), an image process calculating unit 4, a scanner unit 6, a printer unit 7, a main controlling unit 9, an energization switching circuit 10, a main power supply 21, sub-power supply 22, etc., in addition to the NIC 5.

Figure 1:
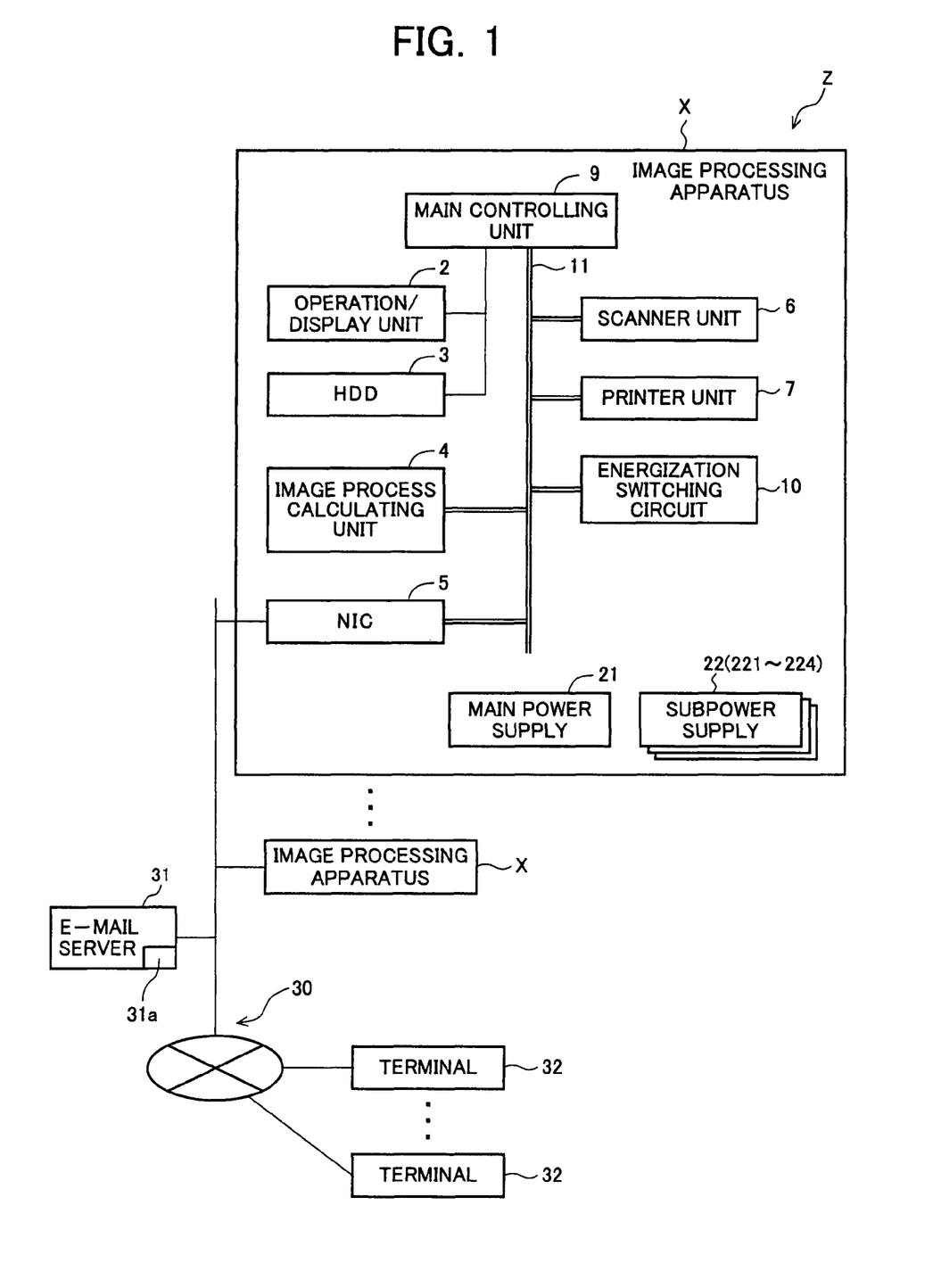
FIG. 1 is a block diagram of an outline structure of an image processing apparatus X according to an embodiment of the present invention and an image processing system Z including the image processing apparatus X as an element.

In the example shown in FIG. 1, the main controlling unit 9, the image process calculating unit 4, the NIC 5, the scanner unit 6, the printer unit 7, and the energization switching circuit 10 are mutually connected through a bus 11.

The main controlling unit 9, the scanner unit 6, and the printer unit 7 are functional blocks, each of which is a part or a group of parts sectionalized in accordance with functions.

The operation/display unit 2 includes an operation input unit for inputting information and a displaying unit for displaying information. The operation input unit includes sheet keys and a touch panel disposed on a surface of a liquid crystal apparatus, for example. The displaying unit includes a liquid crystal apparatus and a LED lamp, for example. The operation/display unit 2 forms a man-machine interface for a user.

The HDD 3 is a large-capacity nonvolatile memory that stores the processed data according to demand when image data read from a document is processed or when image data is printed out. The HDD 3 is also used to save e-mail data obtained from an e-mail server 31.

The image process calculating unit 4 is composed of a signal processing circuit only for it or a DSP (Digital Signal Processing apparatus), etc., and executes various image processing on image data, including generation of print data used for image formation (image data, print job, etc.), generation of image data to be sent to the terminal 32 (e.g., image data encoded in such a prescribed format as JPEG format), encrypting of image data, decrypting of encoded image data, compression/encoding of image data, and decompression (restoration) of compressed/encoded image data.

The scanner unit 6 is an assembly of components including a device that reads an image formed on a document that is placed on a contact glass, which is not shown, or is transferred from an ADF (Automatic Document Feeder), which is not shown, and a MPU (Micro-Processing Unit) that controls the device.

In addition to the ADF, the scanner unit 6 is also provided with, for example, a light source that emits light onto the image surface of a document, and with a mirror that reflects reflected light from the document in a given direction. The scanner unit 6 further includes a movable optical unit that is structured to be movable along the document, a motor that drives the movable optical unit, a stationary mirror that guides light emitted out of the movable optical unit along a given path, a lens that condenses guided light, and a CCD (Charge Coupled Device) that converts light having passed through the lens into electricity to output an electric signal in proportion to the quantity of light (i.e., light reflected at the image surface of the document). The electric signal output from the CCD is transmitted as an image data to the image process calculating unit 4.

The printer unit 7 is a collection of components including a unit that sequentially sends out recording paper sheets stored in a paper feeding cassette, which is not shown, one by one to transfer the recording paper sheets to a paper ejecting tray via a given image formation position and forms (puts out) an image on the recording paper sheet at the image formation position on the basis of document image data read by the scanner unit 6 from a document or of printing image data generated by the image process calculating unit 4, and an MPU that controls the unit.

The image processing apparatus X functions as a copier by carrying out an image forming processing based on a document image data, and functions as a printer by carrying out an image forming processing based on a print request (print job) receiving from the terminal 32.

The printer unit 7, for example, includes a photosensitive drum that carries an image, an electrifier that electrifies the photosensitive drum, an exposure device that writes a static latent image which is based on given image data or print job on the surface of the photosensitive drum, a developer that develops the static latent image into a toner image, a transferer that transfers the toner image on the photosensitive drum to a recording paper sheet, and a motor that drives the photosensitive drum and paper transfer rollers.

The NIC 5 is a communication interface (an instance of a communication unit) that transmits and receives data to and from an external apparatus, such as an e-mail server 31, through the network 30, which is composed of, for example, a LAN conforming to the IEEE standard 802.3, the Internet, etc.

The main power supply 21 and the subpower supply 22 (221 to 224) are power circuits for supplying electric power to each of the constituents of the image processing apparatus X.

The energization switching circuit 10 is the switching circuit (an instance of an energization switching unit) that switches, separately, on and off of the electric current flow to each function block such as the main controlling unit 9, the scanner unit 6 and the printer unit 7, etc. by controlling whether or not the subpower supply 22 must be connected to a commercial power supply according to a control signal received from the NIC 5. The energization switching circuit 10 is capable of switching each function block such as the main controlling unit 9, scanner unit 6 and printer unit 7, separately from energizing to non-energizing or vice-versa, independent of that to the NIC 5.

The main controlling unit 9 controls each of the operation/display unit 2, the HDD 3, and the image process calculating unit 4 and gives/receives the information necessary for the data processing performed by MPU included in the scanner unit 6 and the printer unit 7 and the information acquired from the data processing.

For example, the main controlling unit 9 delivers to the MPU included in the printer unit 7 the information such as a size of a recording paper sheet where an image will be formed, a reduction rate and a density correction value of the output image, and whether a color image forming processing or a monochrome image forming processing is performed, while the main controlling unit 9 acquires from the MPU included in the printer unit 7 the information about how many recording paper sheets are completed in the image formation, the information about errors occurred in the printer unit 7, etc.

The main controlling unit 9 delivers to the MPU included in the scanner unit 6 the information of an image reading range in a document, while the main controlling unit 9 acquires from the MPU included in the scanner unit 6 the information about how many documents are completed using ADF in the image reading, the image data read by the scanner unit 6, the information about errors occurred in the ADF, etc.

The main controlling unit 9 further performs a processing of requesting through the NIC 5 to the e-mail server 31 the transmission of e-mail data addressed to the image processing apparatus including the unit 9 and stored in the storage unit 31a to acquire the e-mail data.

The structure of the NIC 5 included in the image processing apparatus X is described with reference to a block diagram shown in FIG. 2.

The NIC 5 includes a bus connector 51, a bus controlling unit 52, an MPU 53, a memory controlling unit 54, a ROM 55, a flash memory 56, a network controlling unit 57, a network connector 58, etc.

The bus connector 51 is a connector connected to the bus 11, and the bus controlling unit 52 performs signal communication with other devices through the bus 11.

The network connector 58 is a connector physically connected to the network 30, and the network controlling unit 57 controls communication compliant with a predetermined network protocol, for example, the IEEE 802.3 standard and TCP/IP and the like.

The MPU 53 is a calculating unit that executes programs preliminarily stored in the ROM 55 to perform various processing such as processing of relaying the signal transmission between the bus 11 and the network 30, a processing of responding to a request when a predetermined processing is requested from a terminal 32 through the network 30, etc. The executed programs are deployed and executed on a RAM not shown, which is built into the MPU 53. The MPU 53 accesses to the ROM 55 and the flash memory 56 through the memory controlling unit 54.

The ROM 55 of the NIC 5 stores the programs executed by the MPU 53 and the data referred to by the MPU 53.

On the other hand, the flash memory 56 of the NIC 5 stores the data stored and referred to in the course of execution of processing by the MPU 53.

The MPU 53 of the NIC 5 performs processing of inquiring whether e-mail data addressed to the image processing apparatus X have arrived, i.e., whether new e-mail data addressed to the image processing apparatus stored in the storage unit 31a of the e-mail server 31 (hereinafter, called a new e-mail inquiring processing). In this new e-mail inquiring processing, an e-mail ID and a password are necessary for identifying the image processing apparatus X. Therefore, the flash memory 56 of the NIC 5 preliminarily stores the e-mail ID and the password.

The MPU 53 of the NIC 5 includes a clock oscillator 53a that generates an oscillation signal at a constant interval. The MPU 53 of the NIC 5 acquires the current time from the main controlling unit 9 at a predetermined time and interval. The time thus acquired is hereinafter referred to as a counting start time. Based on the oscillation signal of the clock oscillator 53a, the MPU 53 of the NIC 5 counts the time elapsed since the counting start time is acquired from the main controlling unit 9 and counts the current day of the week and the current time based on time elapsed and the counting start time.

The day of the week and the current time counted by the MPU 53 of the NIC 5 are reset if the NIC 5 becomes to the non-energized state. Therefore, when the main controlling unit 9 is in the "energized state", the MPU 53 of the NIC 5 acquires the current time (including a date, day of the week, and clock time) from a calendar administrating unit 98 of the main controlling unit 9, which is described later (see FIG. 3), and performs a time correcting processing based on the acquired time.

In the time correcting processing, for example, when the main controlling unit 9 is in the "energized state", the MPU 53 of the NIC 5 periodically acquires the time at that point from the calendar administrating unit 98 of the main controlling unit 9 and restarts the time counting based on the clock signal of the clock oscillator 53a using this current time as the counting start time. As a result, the time counted by the NIC 5 is corrected based on the counted clock time of the calendar administrating unit 98. Subsequently, the MPU 53 of the NIC 5 continuously counts the time for controlling energization after the correction.

Figure 3:
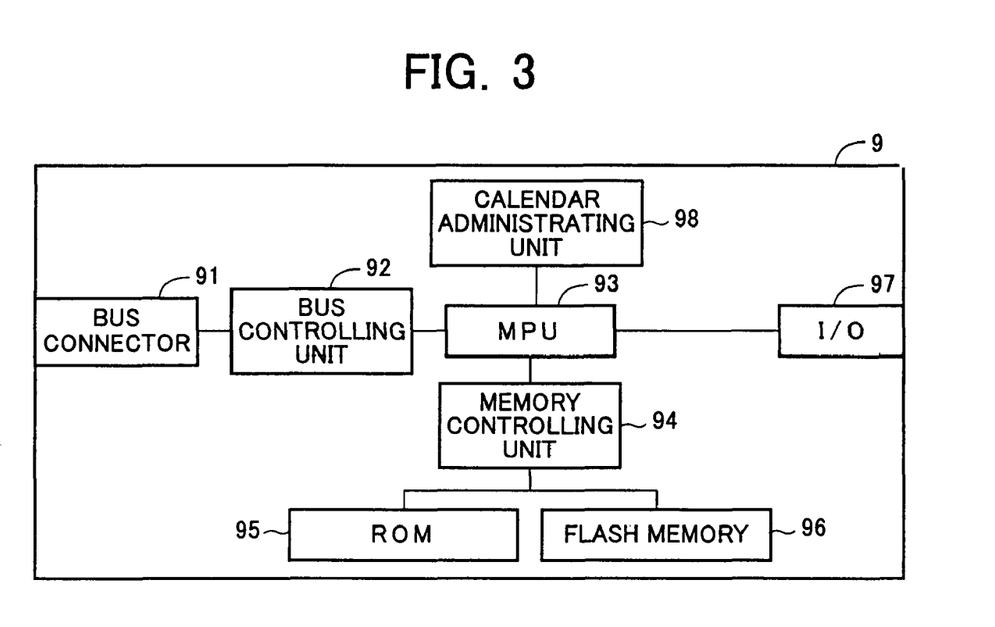
FIG. 3 is a block diagram of an outline structure of a controlling unit included in the image processing apparatus X.

The structure of the main controlling unit 9 incorporated in the image processing apparatus X is described referring to the block diagram shown in FIG. 5.

The main controlling unit 9 includes a bus connector 91, a bus controlling unit 92, an MPU 93, a memory controlling unit 94, ROM 95, a flash memory 96, an I/O port 97, and a calendar administrating unit 98.

Each of the bus connector 91, bus controlling unit 92, memory controlling unit 94, ROM 95, and flash memory 96 has the similar function as that representative to each of the bus connector 51, bus controlling unit 52, memory controlling unit 54, ROM 55, and flash memory 56, which are incorporated in the NIC 5. Of course, it is needless to say that the contents of programs and data stored in the ROM 95 and flash memory 96 are different from those stored in the ROM 55 and flash memory 56 of the NIC 5.

The main controlling unit 9 controls the devices involved in various image processing with the execution of the programs stored in the ROM 95 and flash memory 96 by the MPU 93.

The I/O port 97 of the main controlling unit 9 is connected to a signal line through which an output control signal is transmitted to a device, which is to be a controlled object of the main controlling unit 9, and to a signal line through which various input detected signals are transmitted from various sensors to the main controlling unit 9. The I/O port 97 thus serves as an interface relaying between the signal lines and the MPU 93.

For example, the I/O port 97 of the main controlling unit 9 is connected to devices composing the operation/display unit 2 and the HDD 3, and to signal lines leading to various sensors.

The main controlling unit 9 is provided with the calendar administrating unit 98, which has a time counting circuit that counts time. The calendar administrating unit 98 detects the present year, month, day, day of the week, and time on the basis of the time counted by the time counting circuit. The calendar administrating unit 98 is supplied with electric power from a battery charged with electricity supplied from the first subpower supply 221. The calendar administrating unit 98 continues its operation with power supplied from the battery even when power supply from the first subpower supply 221 is cut off.

Figure 2:
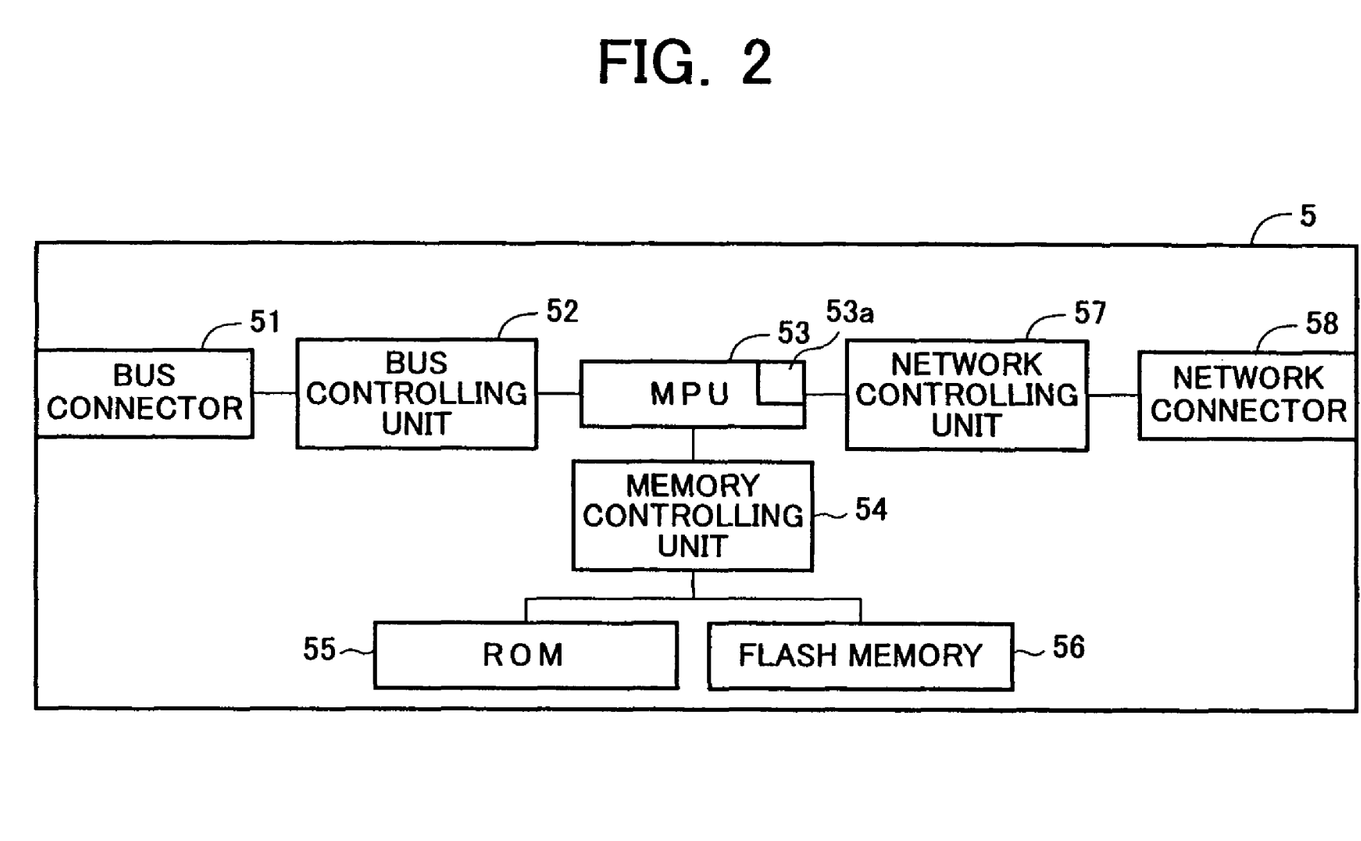
FIG. 2 is a block diagram of an outline structure of a NIC included in the image processing apparatus X.

In FIGS. 2 and 3, the flash memories 56, 96 are depicted as nonvolatile memory units that the MPUs 53, 93 can read and write data. These flash memories 56, 96 may be replaced with other nonvolatile memory units, such as EEPROM (Electrically Erasable Programmable Read-Only Memory).

Figure 4:
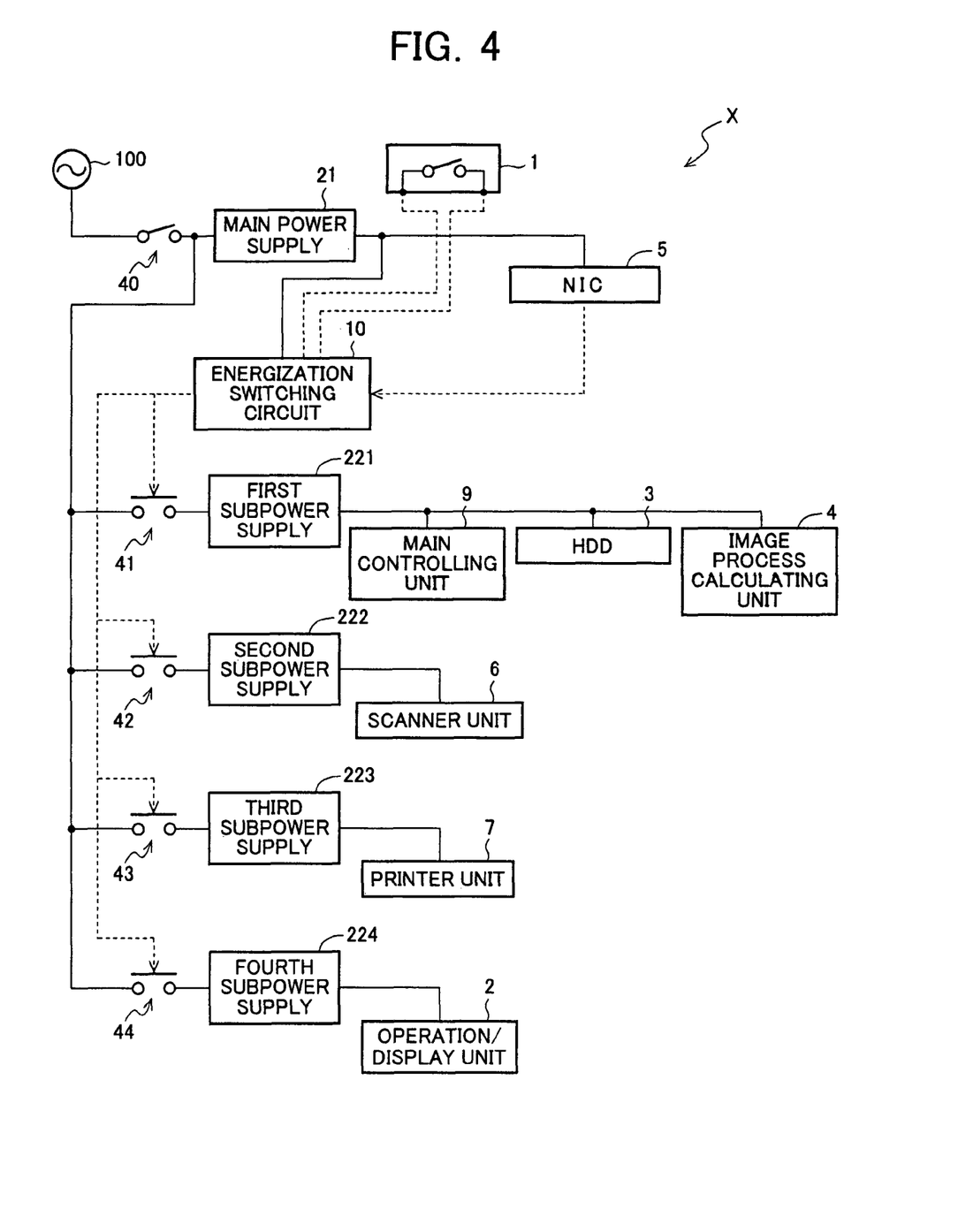
FIG. 4 is a diagram of the electric power system of the image processing apparatus X.

An example of a power connection relation to each function block in the image processing apparatus X is described referring to the power system diagram shown in FIG. 4.

In FIG. 4, power supply lines are represented by continuous lines, and signal transmission lines other than the power supply lines are represented by broken lines.

According to the example shown in FIG. 4, the image processing apparatus X has four subpower supply 22 (221 to 224), which are hereinafter called the first subpower supply 221 to fourth subpower supply 224.

The main power supply 21 is the power supply that supplies electric power to the NIC 5 and to the energization switching circuit 10.

The main power supply 21 is connected to a commercial power supply 100, which is the primary power source to the whole of the image processing apparatus X, via a manual changeover switch 40, with which on and off of the power supply is switched manually. A user carries out changeover operation on the changeover switch 40 to switch on and off of the power supply to the NIC 5 and the energization switching circuit 10. The NIC 5 and energization switching circuit 10 are, therefore, kept in the energized state when the image processing apparatus X is connected to the commercial power supply 100 unless the user operates the manual changeover switch 40 to bring it into the state that the current is cut off from the state that the current is turned on. Once the manual changeover switch 40 is brought into the state that the current is cut off, the whole of the image processing apparatus X is brought into the state that the current is cut off (suspended state).

The first subpower supply 221 is the power supply circuit that supplies power to the main controlling unit 9, to the HDD 3, and to the image process calculating unit 4.

The second subpower supply 222, the third subpower supply 223 and the fourth subpower supply 224 are power supply circuits that supply power to the scanner unit 6, to the printer unit 7, and to the operation/display unit 2, respectively.

Each of first subpower supply 221 to fourth subpower supply 224 is connected to the commercial power supply 100 via the manual changeover switch 40 and each automatic changeover switch 41 to 44, which switches on and off of the power supply on the basis of a given control signal. As shown clearly in FIG. 4, a corresponding relation is established between the automatic changeover switch 41 and the first subpower supply 221, the automatic changeover switch 42 and the second subpower supply 222, the automatic changeover switch 43 and the third subpower supply 223, and the automatic changeover switch 44 and the fourth subpower supply 224.

As a result, when the manual changeover switch 40 is switched to flow the current and each automatic changeover switches 41 to 44 is also switched to flow the current, each of subpower supplies 221 to 224 is brought into the energizing state that the current flow is turned on.

Hereinafter, turning on and cutting off an electric current flow in a power supply line are simply called turning on and cutting off the power, respectively. Likewise, the states that an electric current flow in a power supply line is turned on and is cut off are simply called a turned-on state and cut-off state of the power, respectively.

The automatic changeover switches 41 to 44 function as the energization switching unit that switches each of the function blocks 2, 6, 7, and 9 separately from energized to non-energized or vice-versa as each of the changeover switches 41 to 44 is turned on or off.

Hereinafter, when the NIC 5 is in the energized state (manual changeover switch 40 is in the turned on state of the power) and one or more of the function blocks 2, 6, 7 and 9 are in the state that the current flow is cut off (one or more of the automatic changeover switches 41 to 44 are in the turned-off state), an operation mode of the image processing apparatus X is called a sleep mode. When the NIC 5 and function blocks 2, 6, 7 and 9 are in the energized state, an operation mode of the image processing apparatus X is called an operating mode.

As shown in FIG. 4, the NIC 5 controls, separately, on and off of the current flow to each function block by controlling ON/OFF of every automatic changeover switches 41 to 44 through the energization switching circuit 10, that is, the NIC 5, serves as well the unit for executing energization control over each function block.

The image processing apparatus X has an operation detecting switch 1 of which ON/OFF state is switched according to the operation of the user. The ON/OFF state of the operation detecting switch 1 is detected by the energization switching circuit 10.

The operation detecting switch 1 functions as an energization switch that switches to put the image processing apparatus X into either operating mode or sleep mode.

That is, when the operation detecting switch 1 is switched to ON state in the sleep mode, the energization switching circuit 10 turns on every automatic changeover switch 41 to 44 to shift the image processing apparatus X into the operating mode.

When the operation detecting switch 1 is switched into OFF state in the operating mode, the energization switching circuit 10 turns off every automatic changeover switch 41 to 44 to shift the image processing apparatus X into the sleep mode unless any kind of job is being processed.

In the image processing apparatus X, when each function block is energized, the MPU 53 of the NIC 5 determines on whether the following two conditions (hereinafter called "first sleep condition" and "second sleep condition", respectively) are met. When either of the sleep conditions is met, the image processing apparatus X shifts into the sleep mode where power supply to one or more of the function blocks is cut off due to the control of the NIC 5 for the energization switching circuit 10. In the sleep mode, one or more of four automatic changeover switches 41 to 44 are switched into "OFF state" and one or more of the function blocks become into "the state that the current is cut off." Therefore, when every automatic changeover switch 41 to 44 is switched into "OFF state", a very few devices including the NIC 5 (NIC 5 and the energization switching circuit 10) remain in "energized state" in the image processing apparatus X.

The MPU 53 of the NIC 5 records the sleep mode shift reason information that states which one of the first sleep condition and second sleep condition has been met in the flash memory 56 of the NIC 5 when the operation mode is shifted into the sleep mode.

<First Sleep Condition>

The first sleep condition is the condition that the present date and time fall onto a time zone set to the sleep mode in a preset weekly time schedule (hereinafter called "weekly schedule"). Hereinafter, control of a state of energization of each function block through control over the automatic changeover switches 41 to 44 according to the preset weekly schedule (an instance of a time schedule) is called weekly timer control. The MPU 53 of the NIC 5 executing the weekly timer control is an instance of a schedule controlling unit.

Figure 7:
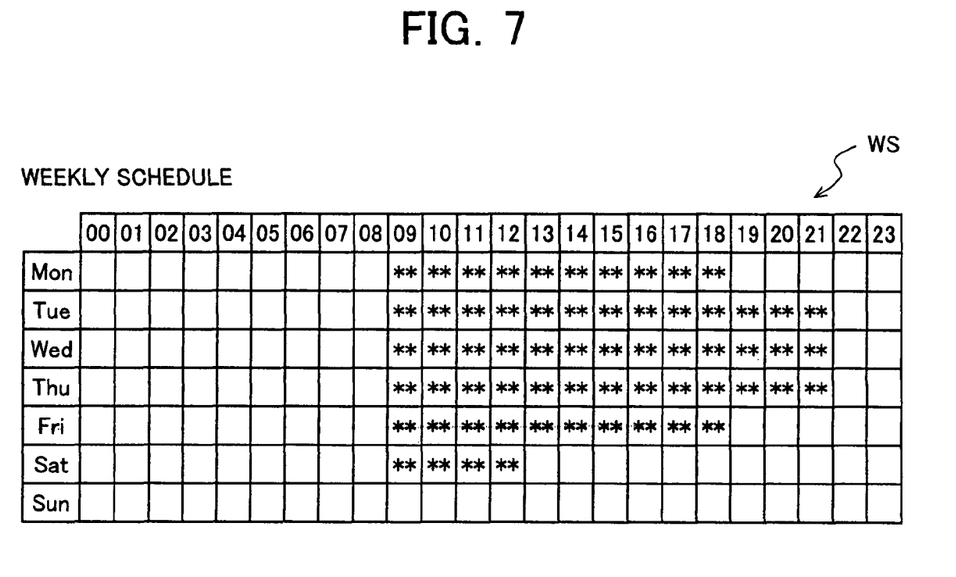
FIG. 7 is a schematic view of a weekly schedule of weekly timer control in the image processing apparatus X.

FIG. 7 is a diagrammatic view of the contents of a weekly schedule WS for weekly timer control. In FIG. 7, each square represents a time zone that is fixed by the day of the week (Monday to Sunday) and time (00 to 23). A blank square represents a time zone set to the sleep mode, and a square marked with "*" represents a time zone set to the operating mode where each function block is energized. The weekly schedule WS is the information that is preset for each of the first subpower supply 221 to fourth subpower supply 224.

The MPU 53 of the NIC 5 obtains information of the weekly schedule WS for each of the first subpower supply 221 to fourth subpower supply 224 in advance from the main controlling unit 9, and stores the weekly schedule WS information in the flash memory 56 in advance.

The MPU 53 of the NIC 5 determines on which one of the sleep mode time zone and the operating mode time zone the present time counted by the clock oscillator 53*a* falls in the weekly schedule WS stored in the flash memory 56. According to the result of the determination, the MPU 53 of the NIC 5 controls the automatic changeover switches 41 to 44 through the energization switching circuit 10 to change, separately, the state of each function block 2, 6, 7 and 9 from "energized state" to "non-energized state" (shift to the sleep mode), or from "non-energized state" to "energized state" (shift into the operating mode).

The main controlling unit 9 has a weekly schedule setting function for allowing a user to set the contents of the weekly schedule WS through control over the operation/display unit 2. The weekly schedule WS set through the weekly schedule setting function is transmitted from the main controlling unit 9 to the NIC 5 and the MPU 53 of the NIC 5 stores the weekly schedule WS in the flash memory 56.

<Second Sleep Condition>

The second sleep condition is the condition that no input operation through the operation/display unit 2 exists when the first sleep condition is not met and any data processing requests (print job, etc.) from an external apparatus through the network 30 have not been received for a given time or longer.

For example, when the NIC 5 determines on whether the second sleep condition is met, the MPU 53 of the NIC 5 detects the presence of input operation to the operation/display unit 2 via the main controlling unit 9 and the bus 11, and also detects the presence of data reception from the terminal 32 via the network controlling unit 57.

By counting time based on oscillation signals from the clock oscillator 53*a*, the MPU 53 of the NIC 5 detects a fact that no input operation through the operation/display unit 2 exists and any data from the terminal 32 through the network 30 has not been received for a given time or longer. According to the detected fact, the MPU 53 of the NIC 5 controls the automatic changeover switches 41 to 44 through the energization switching circuit 10 to switch the state of each function block 2, 6, 7 and 9 from "energized state" to "non-energized state" (from operating mode into the sleep mode).

Figure 5:
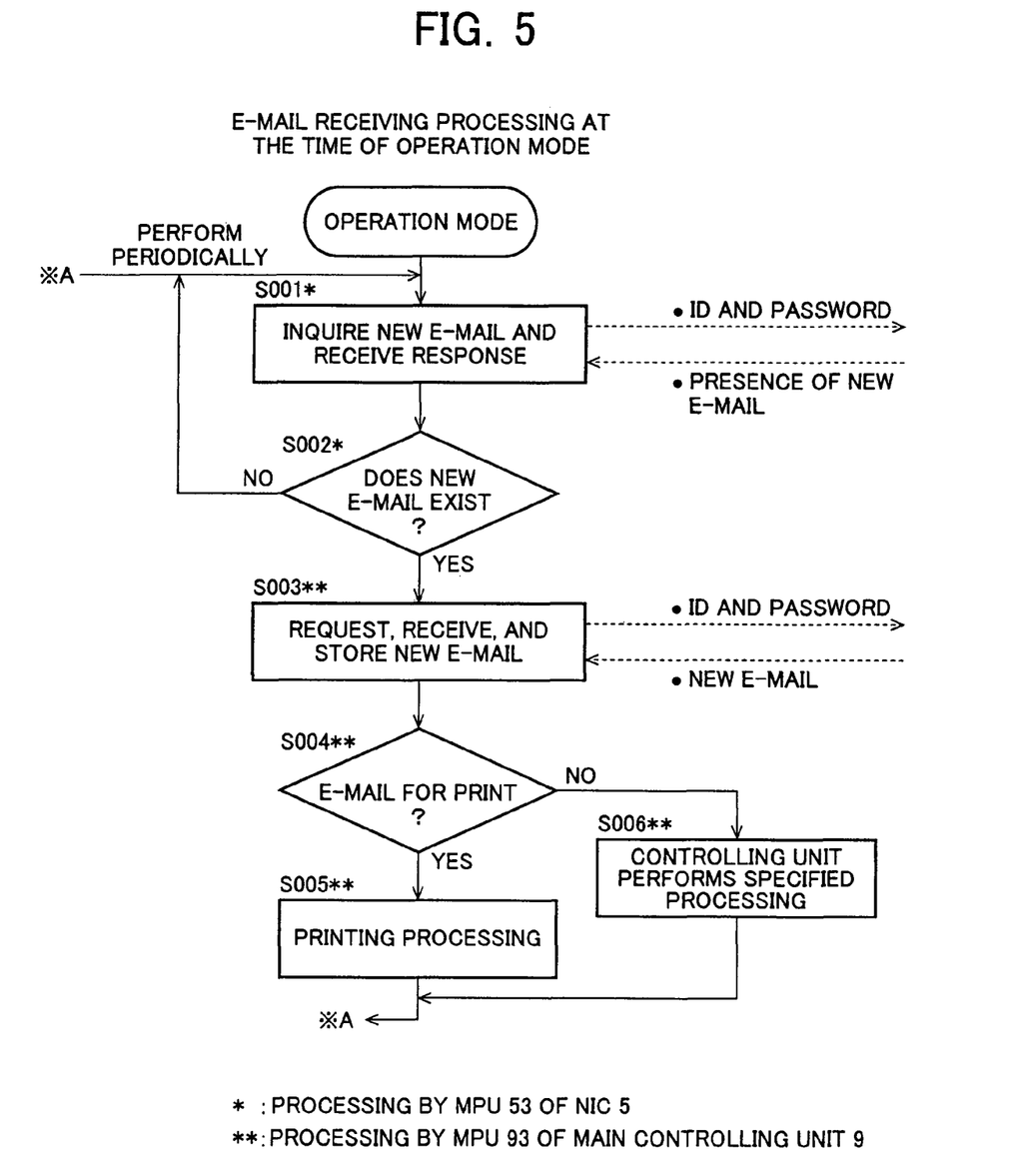
FIG. 5 is a flowchart of a procedure of an e-mail receiving processing in an operation mode of the image processing apparatus X.

With reference to a flowchart shown in FIG. 5, it is explained how the image processing apparatus X executes the procedure of the mail receiving processing executed in the operation mode. S001, S002, etc., shown below are identification symbols of the processing procedures (steps).

[Steps S001 and S002]

The MPU 53 of the NIC 5 performs a processing of inquiring whether new e-mail exists to the e-mail server 31 through the network controlling unit 57 (a portion of the communicating unit), i.e., a processing of inquiring whether e-mail data addressed to the image processing apparatus are stored in the storage unit 31*a* of the e-mail server 31 (the new e-mail inquiring processing), and a processing of receiving the response thereto (S001).

At step S001, the MPU 53 of the NIC 5 transmits to the e-mail server 31 the e-mail ID and the password preliminarily stored in the flash memory 56 of the NIC 5, along with the inquiry command for the new e-mail, and receives the information about the presence of new e-mail returned in response thereto. The new e-mail inquiring processing is performed in conformity with a predetermined protocol such as POP3 and the like.

The MPU 53 of the NIC 5 determines whether a response indicating the presence of new e-mail is received at the processing of step S001 (whether the new e-mail exists) (S002).

If the response indicating the presence of new e-mail is not received in the processing of step S001 in the state of the operation mode, the MPU 53 of the NIC 5 periodically repeats the processing of steps S001 and S002.

On the other hand, if the response indicating the presence of new e-mail is received, the MPU 53 of the NIC 5 shifts the processing to next step S003.

[Steps S003 and S004]

At step S003, the MPU 93 of the main controlling unit 9 controls the NIC 5 to performs a processing of acquiring the new e-mail (e-mail data) addressed to the image processing apparatus from the e-mail server 31 through the NIC 5 (S003, an example of a data acquisition controlling unit).

At step S003, the MPU 93 of the main controlling unit 9 transmits the e-mail ID and the password preliminarily stored in the flash memory 56 of the NIC 5 or the flash memory 96 of the main controlling unit 9 to the e-mail server 31 along with the transmission request command for the new e-mail, receives the e-mail data (new e-mail) returned in response thereto through the NIC 5, and stores the received data in the HDD 3. As a result, the e-mail data loaded into the main controlling unit 9 are erased from the storage unit 31a of the e-mail server 31.

The MPU 93 of the main controlling unit 9 determines whether the received e-mail data are e-mail data for print to which an image data is attached (S004). For example, the MPU 73 of the main controlling unit 9 performs the determining processing of step S004 by checking what command of predetermined commands (a print command requesting a printing processing and commands requesting other processing) is included in the title or the body text of the e-mail data.

[Steps S005 and S006]

If it is determined that the received data are the e-mail data for print at step S004, the MPU 93 of the main controlling unit 9 controls the printer unit 7 to perform a printing processing based on the attached image data (S005) and after that returns the processing to step S001. At step S005, for example, the MPU 93 of the main controlling unit 9 delivers the image data attached to the e-mail data stored in the HDD 3 to the printer unit 7 and outputs a print start instruction to the printer unit 7. As a result, the printer unit 7 performs the printing processing based on the image data attached to the e-mail data. The printer unit 7 is an example of a data processing units executing the data processing (printing processing) based on the e-mail data acquired by the main controlling unit 9.

On the other hand, if it is determined that the received e-mail data are e-mail data not for print, the MPU 73 of the main controlling unit 9 performs a processing specified in the e-mail data (S006), and after that returns the processing to step S001 described above.

The processing specified by the e-mail data not for print may be a processing of storing the attached data (attach file) of the e-mail data in a specified folder within the HDD 3 and a processing of transmitting the file (data) stored in a specified folder within the HDD 3 to a specified e-mail address, for example.

Figure 6:
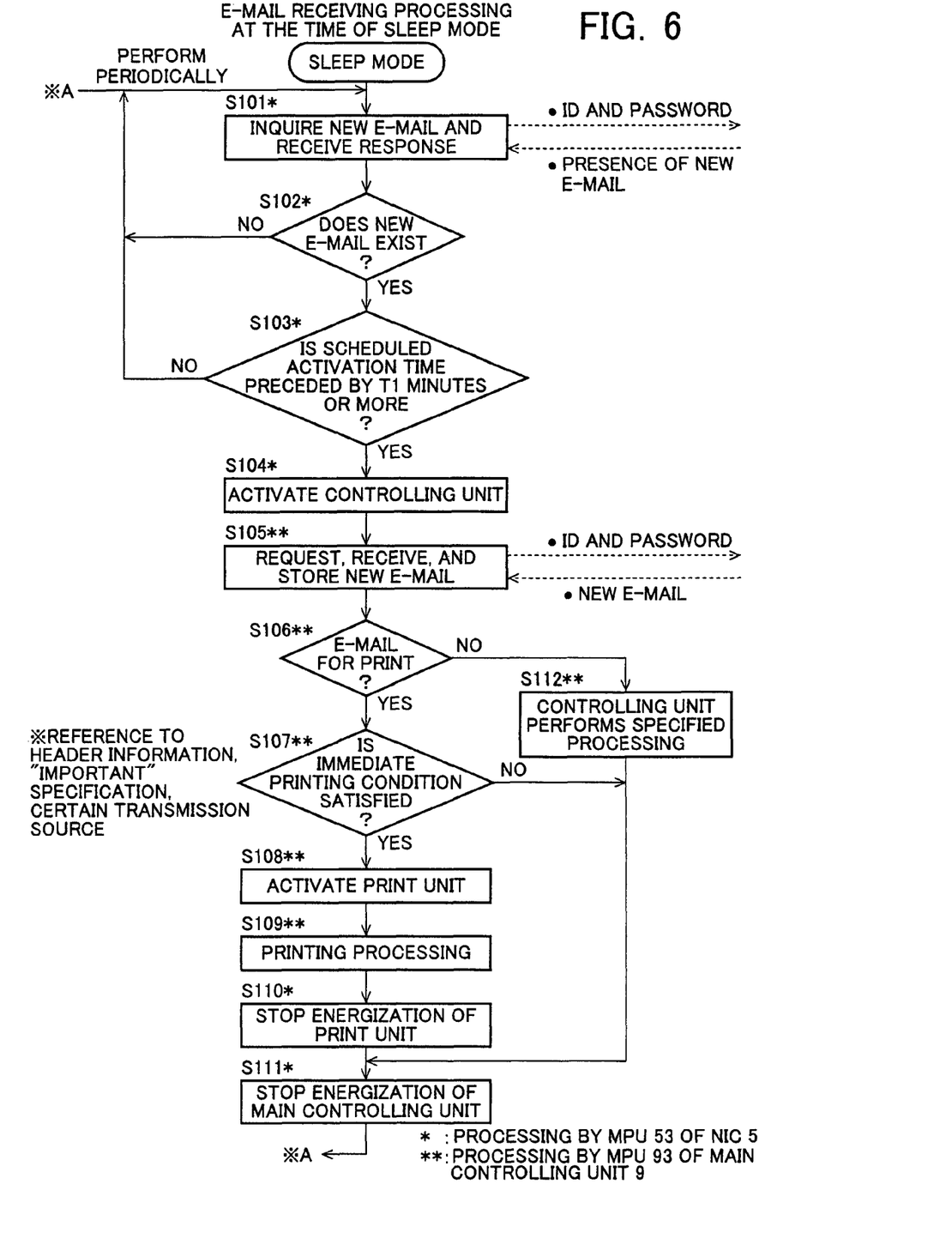
FIG. 6 is a flowchart of a procedure of an e-mail receiving processing in a sleep mode of the image processing apparatus X.

With reference to a flowchart shown in FIG. 6, it is explained how the image processing apparatus X executes the procedure of the mail receiving processing in the sleep mode. S101, S102, etc., shown below are also identification symbols of the processing procedures (steps).

[Steps S101 to S103]

The MPU 53 of the NIC 5 performs the new e-mail inquiring processing to the e-mail server 31 through the network controlling unit 57 (a portion of the communicating unit) in the same manner as that of step S001 (S101).

The MPU 53 of the NIC 5 determines whether a response indicating the presence of new e-mail is received at the processing of step S101 (whether the new e-mail exists) (S102). The MPU 53 of the NIC 5 performing the processing of steps S101 and S102 is an example of a data presence checking unit that checks whether the storage unit 31a of the e-mail server 31 (an example of the server apparatus) stores e-mail data (an example of the object data for processing) addressed to the image processing apparatus.

If the response indicating the presence of new e-mail is received in the processing of step S101 in the state of the sleep mode, the MPU 53 of the NIC 5 also determines whether the time at that point (i.e., the time when it is confirmed that the storage unit 31a of the e-mail server 31 stores e-mail data addressed to the image processing apparatus) precedes the next scheduled activation time (date and time) of the weekly timer control by a predetermined set time t1 [minutes] or more (S103). The next scheduled activation time of the weekly timer control is the nearest future time from the execution time of the processing of step S103 among times set to the operation mode in the weekly schedule WS.

If the response indicating the presence of new e-mail is not received in the processing of step S101, or if the time period from the time of confirmation of the presence of new e-mail to the next scheduled activation time is shorter than the set time t1 [minutes], the MPU 53 of the NIC 5 returns the processing to step S101 described above, and if not, returns the processing to step S104 described later.

If the processing is returned to step S101, the MPU 53 of the NIC 5 periodically repeats the processing of steps S101 to S103.

The MPU 53 of the NIC 5 executes the processing of steps S101 and S102 (an example of a checking processing of the data presence checking unit) every time when a periodical passage of time is detected (an example of a check execution controlling unit). The periodical passage of time is counted by the MPU 53 of the NIC 5 based on the oscillation signal of the clock oscillator 53a.

In other cases, for example, while the operation/display unit 2 is in the "energized state" and other functional blocks 3, 4, 6, 7, and 9 are in the "non-energized state", when the MPU 53 of the NIC 5 detects that a predetermined incoming e-mail checking operation is performed in the operation/display unit 2, the processing of steps S101 and S102 may be executed.

Similarly, when the MPU 53 of the NIC 5 detects that a predetermined e-mail checking request is received from an external apparatus (e.g., terminal such as a personal computer) through the network controlling unit 57 (a portion of the communicating unit) in the state of the sleep mode, the processing of steps S101 and S102 may be executed.

[Step S104]

On the other hand, at step S104, the MPU 53 of the NIC 5 controls the energization switching circuit 10 to activate the main controlling unit 9 in the "non-energized state" (i.e., switching into the "energized state").

When the main controlling unit 9 is in the "non-energized state", the MPU 53 of the NIC 5 of the embodiment controls the energization switching circuit 10 to switch the main controlling unit 9 into the "energized state" if both of the following two conditions are satisfied (an example of an automatic activating unit).

A first condition is that it is confirmed in the processing of steps S101 and S102 that the storage unit 31a of the e-mail server 31 stores the e-mail data addressed to the image processing apparatus (which is determined at step S102).

A second condition is that the time of the confirmation of presence (storage in the storage unit 31a of the e-mail server 31) of the e-mail addressed to the image processing apparatus precedes the next scheduled activation time of the main controlling unit 9 in the weekly timer control performed by the MPU 53 of the NIC 5 by a predetermined set time t1 [minutes] or more (which is determined at step S103). For example, the set time t1 is arbitrarily set (e.g., on the order of few minutes to ten-odd minutes) through the operation/display unit 2 and stored in the flash memory 56 of NIC 5.

Since the first condition is provided, when the main controlling unit 9 is activated from the "non-energized state", the main controlling unit 9 can certainly acquire the e-mail data addressed to the image processing apparatus from the e-mail server 31. That is, the main controlling unit 9 is not wastefully activated and the power consumption of the image processing apparatus X can be suppressed as much as possible.

Since the second condition is provided, when the waiting time until the next scheduled activation time of the main controlling unit 9 is relatively short, the stopped main controlling unit 9 is not activated to perform the processing of acquiring the e-mail data. As a result, the power consumption of the main controlling unit 9 can be suppressed as much as possible. Since the main controlling unit 9 is activated by the weekly timer control and the e-mail data are acquired and processed in the processing of above steps S001 to S006 when the next scheduled activation time comes (in the near future), the time of acquisition of the new mail is not considerably and problematically delayed.

[Steps S105 and S106]

The MPU 73 of the main controlling unit 9 activated in the processing of step S104 performs a processing of acquiring the new e-mail (e-mail data) addressed to the image processing apparatus from the e-mail server 31 through the NIC 5 in the same manner as that of step S003. The acquired e-mail data are stored in the HDD 3. The e-mail data loaded into the main controlling unit 9 are erased from the storage unit 31a of the e-mail server 31.

The e-mail data includes predetermined header information as the accompanying information thereof, and the header information includes an e-mail address that identifies the transmission source transmitted the e-mail data to the e-mail server 31 and information indicating importance of the e-mail data (hereinafter, called importance information).

That is, the main controlling unit 9 performing the processing of step S105 is an example of the data acquisition controlling unit that acquires through the NIC 5 the e-mail data addressed to the image processing apparatus and stored in the storage unit 31a of the e-mail server 31 as well as an example of an accompanying information acquiring unit that acquires the accompanying information of the e-mail data.

The MPU 93 of the main controlling unit 9 determines whether the received e-mail data are e-mail data for print to which the image data is attached in the same manner as that of step S004 described above (S106).

[Step S107]

If it is determined at step S106 that the received data are the e-mail data for print, the MPU 93 of the main controlling unit 9 determines whether contents of the header information (an example of the accompanying information) of the e-mail data satisfy a predetermined immediate printing condition (S107), if the immediate printing condition is satisfied, the processing is shifted to step S108 described later, and if the condition is not satisfied, the processing is shifted to step S111 described later.

The immediate printing condition is, for example, that at least one of the following two conditions is satisfied.

A first condition is that the importance information included in the header information has contents indicating that the e-mail data are data with high importance.

A second condition is that the e-mail address (identification information) of the e-mail data transmission source included in the header information is identical to any one of a predetermined one or more specific e-mail addresses (hereinafter, called specific transmission source addresses).

The specific transmission source address is an e-mail address for specifying that the stopping printer unit 7 should be activated to perform a printing process immediately when the image processing apparatus X receives the e-mail data for print transmitted from the source having the address. The specific transmission source address is, for example, preliminarily set through the operation/display unit 2 and stored in the flash memory of NIC 5.

[Steps S108 and S109]

At step S108, the MPU 73 of the main controlling unit 9 outputs an activation instruction for the printer unit 7 to the MPU 53 of the NIC 5, and the MPU 53 of the NIC 5 controls the energization switching circuit 10 to activate the "non-energized" printer unit 7 (i.e., switching into the "energized state").

In this way, when the printer unit 7 is in the "non-energized state", the MPU 53 of the NIC 5 of the embodiment controls the energization switching circuit 10 to switch the printer unit 7 into the "energized state" if it is confirmed in the processing of steps S101 and S102 that the storage unit 31a of the e-mail server 31 stores the e-mail data addressed to the image processing apparatus (which is determined at step S102) and the immediate printing condition is also satisfied by the header information (accompanying information) of the e-mail data (an example of an automatic activating unit).

In this way, while the printer unit 7 is stopped, the image processing apparatus X selectively processes only certain e-mail data for print which satisfies the immediate printing condition.

As a result, the stopping printer unit 7 is not activated when less important e-mail data are received and the power consumption of the image processing apparatus X can be suppressed as much as possible.

The MPU 73 of the main controlling unit 9 controls the printer unit 7 activated in the processing of step S108 to perform a printing processing based on the image data attached to the e-mail data in the same manner as that of step S005 described above (S109).

[Steps S110 and S111]

When the printing processing of the printer unit 7 is terminated, the MPU 53 of the NIC 5 controls the energization switching circuit 10 to stop the activated printer unit 7 again (switching to the "non-energized state") (S110).

In this way, after the printer unit 7 switched into the "energized state" in the processing of step S108 performs the printing processing based on the e-mail data acquired in the processing of step S105, the MPU 53 of the NIC 5 controls the energization switching circuit to switch the printer unit 7 into the "non-energized state" (an example of an automatic stopping unit).

The MPU 53 of the NIC 5 also controls the energization switching circuit 10 to stop the activated main controlling unit 9 again (switching to the "non-energized state") (S111).

In this way, after the main controlling unit 9 switched to the "energized state" in the processing of step S104 acquires the e-mail data addressed to the image processing apparatus from the e-mail server 31 (S105), the MPU 53 of the NIC 5 controls the energization switching circuit into switch the main controlling unit 9 to the "non-energized state" (an example of the automatic stopping unit).

[Step S112]

On the other hand, if it is determined that the received e-mail data are e-mail data not for print, the MPU 93 of the main controlling unit 9 performs a processing specified in the e-mail data (S112), and the processing is shifted to step S111 described above, in the same manner as that of step S006. As a result, the main controlling unit 9 is switched into the "non-energized state".

After performing the processing of step S111 (the stopping processing of the main controlling unit 9), the MPU 53 of the NIC 5 returns the processing to step S101 described above.

As described above, the image processing apparatus X performs a processing of checking whether the storage unit 31a of the e-mail server 31 stores the e-mail data addressed to the image processing apparatus X while the main controlling unit 9 performing the e-mail data acquiring processing and the printer unit 7 performing the printing processing are not energized (S101). Therefore, the power consumption of the main controlling unit 9 and the printer unit 7 can be suppressed.

In the image processing apparatus X shown above, the NIC 5 (communicating unit) also works as a unit that performs the processing of checking whether the e-mail data addressed to the image processing apparatus X exist in the e-mail server 31 (S101) and the processing of automatically activating the main controlling unit 9 etc., (S104, S108).

However, a circuit, processing apparatus, etc., performing the same checking processing and automatic activating processing may be provided separately from the NIC 5 and the functional blocks 2, 3, 4, 6, 7, and 9. However, such a circuit or processing apparatus must be maintained in the "energized state" regardless of the energization control of the functional blocks 2, 3, 4, 6, 7, and 9.

The image processing apparatus X activates the main controlling unit 9 (S104) to acquire the new e-mail from the e-mail server 31 (S105) if a condition that the new e-mail addressed to the image processing apparatus X exists in the e-mail server 31 (determined at S102) and a condition that is based on the next scheduled activation time of the weekly timer control (determined at S103) are satisfied.

However, the image processing apparatus may acquire the new e-mail from the e-mail server 31 only on the condition that the new e-mail addressed to the image processing apparatus exists in the e-mail server 31.

The image processing apparatus X activates the stopping printer unit 7 (S108) to perform the printing processing based on the e-mail data for print (S109) if the condition that the new e-mail addressed to the image processing apparatus exists in the e-mail server 31 (determined at S102) and the immediate printing condition (determined at S107) are satisfied.

However, the image processing apparatus may perform the activation of the stopping printer unit 7, etc., only on the condition that the new e-mail addressed to the image processing apparatus exists in the e-mail server 31.

For example, by adding to the MPU 53 of the NIC 5 a function of executing the processing of acquiring the header information (accompanying information) of the new e-mail addressed to the image processing apparatus from the e-mail server 31, the image processing apparatus may activate the stopping main controlling unit 9 to acquire the new e-mail from the e-mail server 31 only if the condition that the new e-mail addressed to the image processing apparatus exists in the e-mail server 31 and the immediate printing condition are satisfied.

Although e-mail data is shown as an example of data processed by the image processing apparatus X in the above embodiments, an image processing apparatus may process other data.

For example, the e-mail server 31 may be replaced with a server apparatus that is a computer including a storage unit such as a hard disk, and the storage unit of the server apparatus may be shared among one or more terminals and image processing apparatuses in an image processing system.

In this case, for example, folders corresponding to each image processing apparatus sharing the storage unit may be provided in the storage unit of the server apparatus, and the image processing apparatuses may be structured such that the NIC, etc., included in each image processing apparatus recognizes the object data for processing to be processed such as print data existing in the folder corresponding to that apparatus as the data addressed to that apparatus.

The present invention is applicable to an image processing apparatus.

In the image processing apparatus according to the present invention, the data presence checking unit can check whether the storage unit of the server apparatus stores the object data for processing addressed to the image processing apparatus while the data acquisition controlling unit is not energized. If the automatic activating unit switches the data acquisition controlling unit from the non-energized state into the energized state, the data acquisition controlling unit can certainly acquire the object data for processing addressed to the image processing apparatus. That is, the data acquisition controlling unit is not wastefully activated. As a result, the image processing apparatus of the present invention can perform the processing of checking periodically or at an arbitrary timing whether data (such as e-mail data) addressed to the image processing apparatus exist in the server apparatus and the processing of receiving the data, while suppressing the power consumption as much as possible.

The invention claimed is:

1. An image processing apparatus including a communicating unit that communicates with a predetermined server apparatus, comprising:

a data presence checking unit that communicates with the server apparatus through the communicating unit to check whether a storage unit of the server apparatus stores object data for processing addressed to the image processing apparatus;

a data acquisition controlling unit that acquires through the communicating unit the object data for processing addressed to the image processing apparatus and stored in the storage unit of the server apparatus;

an energization switching unit that switches the data acquisition controlling unit from energized to non-energized or vice-versa independently of the energization for the communicating unit and the data presence checking unit; and an automatic activating unit that controls the energization switching unit to switch the data acquisition controlling unit into the energized state on the condition that at least the data presence checking unit confirms that the storage unit of the server apparatus stores the object data for processing addressed to the image processing apparatus when the data acquisition controlling unit is in the non-energized state.

2. The image processing apparatus as defined in claim 1, comprising an automatic stopping unit that controls the energization switching unit to switch the data acquisition controlling unit into the non-energized state after the data acquisition controlling unit switched into the energized state by the automatic activating unit acquires the object data for processing addressed to the image processing apparatus and stored in the storage unit of the server apparatus.

3. The image processing apparatus as defined in claim 1 or 2, wherein the communicating unit also works as the data presence checking unit.

4. The image processing apparatus as defined in claim 1 or 2, wherein the communicating unit also works as the automatic activating unit.

5. The image processing apparatus as defined in claim 1 or 2, comprising a data processing unit that executes a data processing based on the object data for processing acquired by the data acquisition controlling unit, wherein the energization switching unit also switches the data processing unit from energized to non-energized or vice-versa independently of the energization for the communicating unit and the data presence checking unit, and wherein when the data processing unit is in the non-energized state, the automatic activating unit controls the energization switching unit to switch the data processing unit into the energized state on the condition that at least the data presence checking unit confirms that the storage unit of the server apparatus stores the object data for processing addressed to the image processing apparatus.

6. The image processing apparatus as defined in claim 5, wherein after the data processing unit switched into the energized state by the automatic activating unit performs a data processing based on the object data for processing acquired by the data acquisition controlling unit, the automatic stopping unit controls the energization switching unit to switch the data processing unit into the non-energized state.

7. The image processing apparatus as defined in claim 5, wherein the object data for processing includes the print data for printing processing and the data processing unit performs a printing processing based on the print data.

8. The image processing apparatus as defined in claim 1 or 2, comprising an accompanying information acquiring unit that communicates with the server apparatus through the communicating unit to acquire accompanying information of the object data for processing addressed to the image processing apparatus and stored in the storage unit of the server apparatus, wherein the automatic activating unit switches one or both of the data acquisition controlling unit and the data processing unit into the energized state also on the condition that the accompanying information acquired by the accompanying information acquiring unit satisfies a predetermined condition.

9. The image processing apparatus as defined in claim 8, wherein the accompanying information includes one or both of identification information of a transmission source transmitting the object data for processing to the server apparatus and information representing importance of the object data for processing.

10. The image processing apparatus as defined in claim 1 or 2, comprising a schedule controlling unit that controls the energization switching unit in accordance with a predetermined time schedule to control at least the energization state of the data acquisition controlling unit, wherein the automatic activating unit switches the data acquisition controlling unit into the energized state also on the condition that the time of the next scheduled activation of the data acquisition controlling unit activated by the schedule controlling unit is preceded by a predetermined time period or more by the time when the data presence checking unit confirms that the storage unit of the server apparatus stores the object data for processing addressed to the image processing apparatus.

11. The image processing apparatus as defined in claim 1 or 2, comprising a check execution controlling unit that controls an execution timing of the checking processing of the data presence checking unit.

12. The image processing apparatus as defined in claim 11, wherein the check execution controlling unit executes the checking processing of the data presence checking unit based on one or more of the detection of periodical passage of time, the detection of reception of predetermined information from the external apparatus through the communicating unit, and the detection of predetermined operation on an operation input unit included in the image processing apparatus.

13. The image processing apparatus as defined in claim 1 or 2, wherein the object data for processing are e-mail data.

* * * * *